United States Patent
Rieder et al.

(10) Patent No.: US 10,647,024 B2
(45) Date of Patent: May 12, 2020

(54) WET PRESS CONCRETE SLAB MANUFACTURING

(71) Applicant: GCP Applied Technologies Inc., Cambridge, MA (US)

(72) Inventors: Klaus A. Rieder, Beverly, MA (US); David M. Hughes, Whitegate Northwich (GB); Lukasz M. Marcinkowski, Murowana Goslina (PL)

(*) Notice: Subject to any disclaimer, the term of this patent is extended or adjusted under 35 U.S.C. 154(b) by 369 days.

(21) Appl. No.: 15/528,381

(22) PCT Filed: Oct. 6, 2015

(86) PCT No.: PCT/US2015/054226
§ 371 (c)(1),
(2) Date: May 19, 2017

(87) PCT Pub. No.: WO2016/081080
PCT Pub. Date: May 26, 2016

(65) Prior Publication Data
US 2017/0334089 A1    Nov. 23, 2017

Related U.S. Application Data

(60) Provisional application No. 62/082,684, filed on Nov. 21, 2014.

(51) Int. Cl.
*B28B 3/04*       (2006.01)
*B28B 7/46*       (2006.01)
(Continued)

(52) U.S. Cl.
CPC .......... *B28B 3/04* (2013.01); *B28B 7/46* (2013.01); *B28B 11/245* (2013.01); *B28B 13/06* (2013.01);
(Continued)

(58) Field of Classification Search
CPC ... B28B 3/04; B28B 7/46; B28B 11/245; B28B 13/06; C04B 14/04; C04B 18/02;
(Continued)

(56) References Cited

U.S. PATENT DOCUMENTS 4,030,939 A    6/1977    Mallow
4,108,933 A *  8/1978    Goransson ............. B28B 13/04
                                                    264/42

(Continued)

FOREIGN PATENT DOCUMENTS

EP    0873181    10/1998
EP    2500329     9/2012

(Continued)

OTHER PUBLICATIONS

Voltz, Form PCT/ISA/210, International Search Report, PCT/US2015/054226, dated Dec. 10, 2015, 6 pages.

(Continued)

*Primary Examiner* — Christina A Johnson
*Assistant Examiner* — Xue H Liu
(74) *Attorney, Agent, or Firm* — Craig K. Leon

(57) ABSTRACT

The present invention provides a wet press process and admixture components for making concrete slabs (flags) (16), curb (kerb) units, panels, boards, and other flat shapes, whereby colloidal silica and at least one alkanolamine and optional rheology control components are employed to provide an ideal combination of pressing time, green strength, surface definition, stack-ability, final concrete strength, and permeability. Stack-ability can be expressed in terms of minimum deflection or non-eccentricity of the units while standing on thickness edges at distances apart less than width or standing height. A wet press process typically involves introducing a highly fluid concrete mix into a mold (10,12), applying hydraulic pressure to consolidate the con-
(Continued)

crete (e.g., 1000-3000 PSI) and to extract excess water, removing the pressed concrete (16) while in a green state from the mold (10,12), and then standing the slab (16) units immediately upon removal from the mold (10,12) while in a green state, on an edge adjacent to but spaced apart from other edge-standing units. In further embodiments, rounded aggregates such as naturally occurring sand and/or gravel obtained from local sources can be incorporated into the concrete slabs without defeating (vertical) stack-ability in the green state.

13 Claims, 2 Drawing Sheets

(51) Int. Cl.
| | |
|---|---|
| *B28B 11/24* | (2006.01) |
| *C04B 28/02* | (2006.01) |
| *C04B 40/02* | (2006.01) |
| *B28B 13/06* | (2006.01) |
| *C04B 14/04* | (2006.01) |
| *C04B 18/02* | (2006.01) |
| *C04B 24/12* | (2006.01) |
| *C04B 40/00* | (2006.01) |
| *C04B 103/00* | (2006.01) |

(52) U.S. Cl.
CPC .............. *C04B 14/04* (2013.01); *C04B 18/02* (2013.01); *C04B 24/121* (2013.01); *C04B 28/02* (2013.01); *C04B 40/0071* (2013.01); *C04B 40/02* (2013.01); *C04B 2103/0093* (2013.01); *Y02W 30/92* (2015.05)

(58) Field of Classification Search
CPC ... C04B 24/121; C04B 24/02; C04B 40/0071; C04B 40/02; C04B 2103/0093; Y02W 30/92

USPC ........................................................ 264/333
See application file for complete search history.

(56) References Cited

U.S. PATENT DOCUMENTS

| | | | |
|---|---|---|---|
| 4,263,048 A | 4/1981 | Hacker | |
| 4,316,744 A | 2/1982 | Bergna | |
| 4,786,451 A * | 11/1988 | Lampus | ............... C04B 14/324 |
| | | | 264/101 |
| 5,149,370 A | 9/1992 | Olaussen | |
| 5,573,055 A | 11/1996 | Challand | |
| 7,163,358 B2 | 1/2007 | Greenwood | |
| 2004/0244655 A1* | 12/2004 | Buerge | .................. C04B 24/122 |
| | | | 106/823 |
| 2006/0236895 A1 | 10/2006 | Sommer et al. | |
| 2009/0230352 A1 | 9/2009 | Gimvang | |
| 2010/0230035 A1 | 9/2010 | Frank et al. | |
| 2010/0324173 A1 | 12/2010 | Fischer | |
| 2011/0067600 A1 | 3/2011 | Constantz et al. | |
| 2012/0279426 A1 | 11/2012 | Kuo et al. | |

FOREIGN PATENT DOCUMENTS

| | | |
|---|---|---|
| FR | 2439654 | 5/1980 |
| GB | 1495811 | 12/1977 |
| GB | 2158767 | 11/1985 |
| WO | 9717131 | 5/1997 |
| WO | 9812149 | 3/1998 |
| WO | 2005123871 | 12/2005 |

OTHER PUBLICATIONS

Voltz, Form PCT/ISA/237, Written Opinion of the International Searching Authority, PCT/US2015/054226, dated Dec. 10, 2015, 8 pages.

* cited by examiner

WET PRESS CONCRETE SLAB MANUFACTURING

FIELD OF THE INVENTION

The invention relates to manufacture of concrete paving slabs (flags), curb (kerb) stones, and similar cementitious paver and decorative units; and, more particularly, to a process and admixture for making a concrete slab or other flat-shaped concrete unit which is wet-pressed in a mold, then removed and stood on edge to cure in a vertically "stacked" arrangement.

BACKGROUND OF THE INVENTION

The wet press process is used for making paver units, concrete slabs (flags), and curb (kerb) stones, as well as other shaped objects. First, a mold is filled with a wet concrete mix comprising cement binder and aggregates. Next, hydraulic pressure is applied to remove water from the mix and to consolidate the mix into a compressed shape, which very often is flat (e.g., slab or kerb stone). The unit, immediately after pressing, is strong enough to be removed from the mold. The unit can be placed on a conveyor belt or shipping pallet and allowed to cure overnight.

Unlike typical precast operations, the wet-press process does not ascribe high criticality to water quantity in the concrete mix, because free water is expelled from the mix by hydraulic pressing, while a vacuum device can be employed to facilitate water drainage, such that liberal amounts of water may be used initially, so as to ensure that the concrete mix flows easily into the mold, and completely fills out the corners and edges of the mold.

However, it is important to the structure of the pressed slab or kerb unit that the aggregates be free of contaminants (such as clays); and that dust or "fines" of sufficient quality and uniformity be employed in the concrete mix to obtain a smooth, close-textured surface on the finished unit.

Typically, a paper or porous filter material is used on the bottom of the mold as well as top (or former) of the mold, to permit water to be expelled during pressing while retaining the fine aggregates and cement paste on the surface of the slab. The drainage of water from the concrete mix can be facilitated by a vacuum system. Depending upon the aggregates and conditions, the pouring/pressing/de-molding/stacking process can take place in between 15 and 30 seconds. The duration of the pressing and water drainage of the molded unit can take place in a much shorter time, typically 10 seconds or less.

To achieve highest productivity within confined manufacturing space, wet press manufacturers often employ turntable style station machines (carousel) for accomplishing the mold-filling, pressing/drainage, and de-molding phases. Each wet-pressed slab unit is removed while in the green state from the mold and placed onto its edge, upon which it stands next to (but not physically touching) another edge-standing pressed concrete slab or kerb stone unit. In this manner, the spaced apart concrete units cure using minimum space.

The present inventors refer to this ability of the de-molded green state slabs to be stood on edge next to other edge-standing green state slabs as (vertical) "stack-ability." The vertical "stack" resembles a series of spaced-apart dominoes, which could fall over onto each other, if and when one of the concrete slabs starts to sag due to overly short pressing time, poor consolidation, or weak internal structure.

While concrete admixtures have been evaluated in attempts to improve production or concrete quality in wet press processes, admixture use is rare because none have been found to provide substantial and consistent results. Conventional water-reducing admixtures appear to increase paste viscosity and actually increase pressing time, harming the production process. While some surfactants and/or viscosity modifying agents can reduce pressing time, they have also been found to affect the green strength required for handling the pressed units after removal from the mold and/or to reduce ultimate strength of the concrete unit.

Thus, the present inventors believe that there is a long-standing need in the industry for a wet press method and admixture composition for modifying concrete rheology and internal structure of wet press units, which reduces the pressing time while improving compaction and wet state strength as well as ultimate strength of the units, and provides improved surfaces on the de-molded pressed units.

SUMMARY OF THE INVENTION

In surmounting the disadvantages of wet press processes, the present invention provides a manufacturing process wherein chemical admixtures are employed for achieving an ideal combination of properties such as green strength, (vertical) stack-ability, surface finishability and definition, as well as excellent non-eccentricity when used for high-aspect-ratio geometrical flat shapes or profiles, final strength and lower permeability.

An exemplary process of the present invention for wet press manufacturing of cementitious units (including slabs, curbstones, and the like), comprises:

introducing, into a concrete mold having a plurality of corners to define transverse edges of a molded unit, a concrete mixture comprising a hydratable cement binder, aggregates, and water in an amount sufficient (i) to hydrate the cement binder and (ii) to enable the mixture to flow into corners within the mold (with relatively little or no vibration required);

wet-pressing the concrete mixture within the mold, using hydraulic pressure of 400 to 3000 pounds per square inch, to consolidate the mixture into a shape having at least two edges defining therebetween a width dimension and at least two edges defining therebetween a thickness dimension, wherein the width dimension is at least five times greater than the thickness dimension, and removing excess water from the concrete mixture while in the mold;

removing the wet-pressed concrete from the mold while in a green state;

standing the pressed, green state concrete unit, upon removal from the mold, onto the at least two edges which define the thickness dimension of the concrete unit; and repeating the foregoing steps such that at least three standing pressed, green state concrete units removed from molds are standing, during a curing period, adjacent to each other at a distance apart which is less than their individual width dimension;

wherein the blended concrete mix being introduced into and removed from the mold further comprises: (a) colloidal silica having silica particles with an average particle size of 1 to 100 nanometers (nm); (b) at least one alkanolamine (which may comprise one or more of the following alkanolamines, including but not limited to tetrahydroxyethylethylenediamine, triisopropanolamine, methyldiethanolamine or mixture thereof, optionally in combination with triethanolamine); and (c) optionally, a rheology modifying agent.

In further exemplary embodiments, the standing green state concrete units removed from molds have a deflection of less than 1/100 from vertical (i.e., horizontal movement relative to vertical height (after elapse of 6 hours, at 10-65 degrees Celsius, between 40-100% humidity). More preferably, the deflection (or non-eccentricity) is less than 1/300 from vertical, and most preferably the deflection of the standing concrete slab or other shaped unit is less than 1/600 from vertical (i.e., horizontal movement relative to vertical height (after elapse of 6 hours, at 10-65 degrees Celsius, between 40-100% humidity).

Further advantages and features of the present disclosure are described in further detail hereinafter.

BRIEF DESCRIPTION OF DRAWINGS

An appreciation of the benefits and features of the present disclosure may be more readily comprehended by considering the following written description of preferred embodiments in conjunction with the drawings, wherein.

DETAILED DESCRIPTION OF PREFERRED EMBODIMENTS

Figure 1:
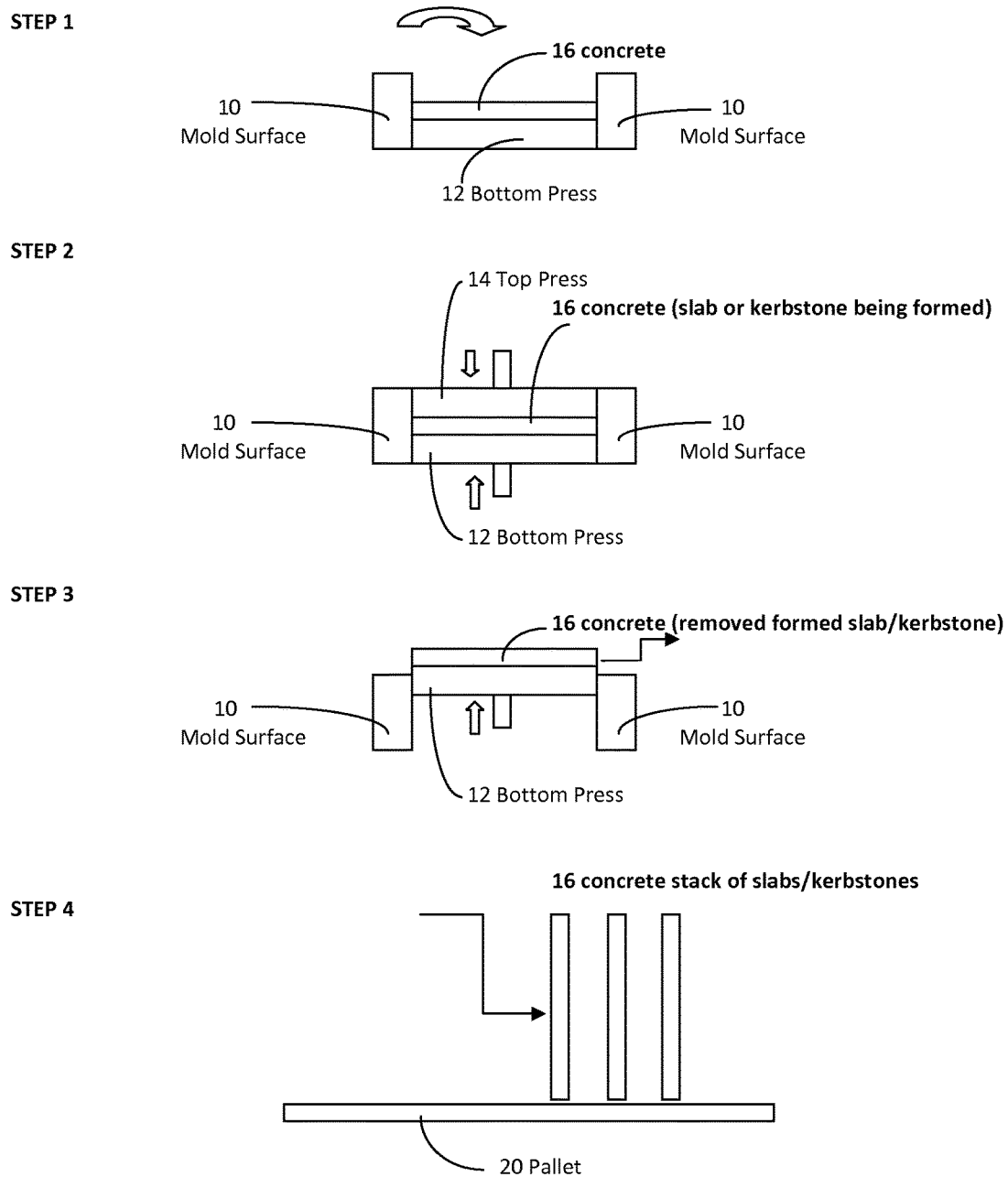
FIG. 1 is a diagram of wet press concrete process for making slabs (flags), curb (kerb) stones, and other relatively flat-shaped or high-aspect ratio shaped structures.

The present invention now will be described more fully hereinafter with reference to the accompanying drawings, in which various exemplary embodiments are shown illustrating variations within the scope of the invention. This disclosure may, however, be embodied in many different forms and should not be construed as limited to the embodiments set forth herein; rather, these embodiments are provided so that this disclosure will be thorough and complete, and will fully convey the scope of the disclosure to those of ordinary skill in the art.

In embodiments pertaining to the wet-press manufacturing of concrete, the following terms may be used and are defined as follows.

The term "cement" as used herein includes hydratable cement such as Portland cement which is produced by pulverizing clinker consisting of hydraulic calcium silicates, aluminates and aluminoferrites, and one or more forms of calcium sulfate (e.g., gypsum) as an interground additive. Typically, Portland cement is combined with one or more supplemental cementitious materials, such as fly ash, granulated blast furnace slag, limestone, natural pozzolans, or mixtures thereof, and provided as a blend. Thus, the term "cement" may also include these supplemental cementitious materials which have been inter-ground with Portland cement during manufacture or are being added separately during the concrete manufacture process.

The term "cementitious" may be used herein to refer to materials that comprise Portland cement or which otherwise function as a binder to hold together fine aggregates (e.g., sand), coarse aggregates (e.g., crushed gravel), or mixtures thereof, in concrete and mortar.

The term "hydratable" as used herein refers to cement or cementitious materials that are hardened by chemical interaction with water. Portland cement clinker is a partially fused mass primarily composed of hydratable calcium silicates. The calcium silicates are essentially a mixture of tricalcium silicate ($3CaO.SiO_2$ or "$C_3S$" in cement chemists' notation) and dicalcium silicate ($2CaO.SiO_2$, "$C_2S$") in which the former is the dominant form, with lesser amounts of tricalcium aluminate ($3CaO.Al_2O_3$, "$C_3A$") and tetracalcium aluminoferrite ($4CaO.Al_2O_3.Fe_2O_3$, "$C_4AF$"). (See e.g., Dodson, Vance H., *Concrete Admixtures* (Van Nostrand Reinhold, New York, N.Y. 1990), page 1).

The term "concrete" is used herein generally to refer to hydratable cementitious mixtures comprising cement, a fine aggregate (e.g., sand) and usually a coarser aggregate (e.g., crushed stone or gravel). In the present invention, a combination of chemical admixture admixtures will be used to modify properties of the concrete.

The term "concrete slab" as used herein is interchangeable with terms such as "concrete flags" (the British nomenclature for concrete slabs), "kerb units" (the British nomenclature for curb units), and is used to refer generally to flat shaped units which can be formed using wet press equipment, such as hydraulic cylinder press equipment for wet-pressing concrete within molds. Such equipment is typically used for making slabs (flags), curb (kerb) units, panels, blocks, and other units used for paving, decks, walks, curbs, and other structures. In exemplary embodiments of the invention, the hydraulic press equipment should be capable of imparting at least 100 pounds per square inch (PSI) for 5-60 seconds, or more preferably at least 500 PSI for 5-30 seconds, and most preferably 1000-3000 for 5-25 seconds, in wet pressing the concrete mixture within the mold.

The term "colloidal silica" as used herein refers to a mixture of a liquid and silica particles which is in a colloidal (not solution) form, and cannot be made simply by mixing silica particles into water. Most industrial processes for making colloidal silica begin by stripping sodium (and a considerable portion of contaminants) from sodium silicate and then suspending the purified silica in a low-surface tension liquid. Hence, the term "colloidal silica" refers to a liquid material and should not be confused with silica fume, which is a dry, powder material used as a concrete admixture that has particle sizes (e.g., average diameter or thickness) of about 150 nm (about 6 millionths of an inch). Colloidal silica therefore provides high purity silica in nanoparticle sizes which are small enough to penetrate the pore structure of cement; and the liquid has low surface tension and carriers the silica particles below the surface of the liquid. As the silica particles, due to their relatively higher purity, bear a high proportion of reactive sites compared to silicates, the silica particles in the colloidal silica react efficiently with calcium hydroxide in the cement pores to generate CSH. Colloidal silicas are nanosized, amorphous, nonporous, and typically spherical silica particles suspended in a liquid phase.

In preferred embodiments of the invention, the colloidal silica is a monosperse or multisperse suspension wherein the silica particles have a generally spherical shape. ("Multisperse" refers to two or more monosperse average size particles mixed together). Preferred colloidal silicas for use in the present invention have a solids content of 1%-50%, a particle radius of 1 to 100 nanometer (nm), and a specific surface area (SSA) of 10 to 1500 square meters per gram ($m^2/g$ $SiO_2$), and more preferably 100 to 500 square meters per gram ($m^2/g$ $SiO_2$). The colloidal silica suspension is in most of the cases clear and does not refract a light beam directed through the liquid.

A colloidal silica contemplated for use in the present invention is commercially available from W. R. Grace & Co.-Conn., Maryland, USA, under the trade name LUDOX®. Various grades, particle size ranges, and concentrations are available and may be used in accordance with formulation requirements or personal preferences. While the use of colloidal silica in the present invention is believed to minimize the amount of excess water used in the concrete mix for the molding step, to reduce the amount of time for pressing the slab and extracting water from the mold, and to confer strength to the wet pressed concrete in the green state, the present invention uses at least one alkanolamine for achieving ultimate (or later strength) in the resultant wet pressed concrete slab unit. Preferred alkanolamines include triisopropanolamine (TIPA), tetrahydroxyethylethlyenediamine (THEED), methyldiethanolamine (MDEA) or mixtures of TIPA, THEED and MDEA. Other preferred combinations comprise one or mixture of TIPA and/or THEED and/or MDEA combined with triethanolamine (TEA).

The one or more alkanolamines believed to be suitable for use in the present invention may include one or more of the following: monoethanolamine (MEA), diethanolamine (DEA) or methyldiethanolamine (MDEA), triethanolamine (TEA), aminoethanolamine (AEEA), monoisopropanolamine, diisopropanolamine, N,N-bis(2-hydroxyethyl)-2-propanolamine (DEIPA), N,N-bis-(2-hydroxypropyl)-N-(hydroxyethyl)amine (EDIPA), and triisopropanolamine (TIPA), tetrahydroxyethylethlyenediamine (THEED), or derivatives thereof. Another exemplary alkanolamine is diglycolamine.

Preferably, the amount of colloidal silica and alkanolamines should be, respectively, 0.03-1.0% actives and 0.0025-0.1% actives, based on weight of cementitious component. However, the relative amounts of each of these components can vary depending upon quality and nature of the cement binder component, supplemental cementitious component, and processing conditions.

The use of colloidal silica has a positive influence on the rheology of the concrete mixture, and, as previously discussed, enables a reduction of the water content of the base mix, which means that less water needs to be pressed out of the concrete, thereby reducing the time needed to achieve a certain concrete slab (or flag) thickness.

It is contemplated that certain other admixture components can be used to advantage in the present invention. Optionally, though preferably, this could include a rheology modifying agent selected from the group consisting of a polycarboxylate type and/or a biopolymer polysaccharide selected from diutan gum, welan (which sometimes is referred to using the brand name WELAN®) gum, xanthan gum, or a mixture thereof.

The use of colloidal silica with an alkanolamine or alkanolamines in combination is believed by the present inventors to permit use of certain additional admixture components which themselves can confer benefits upon the wet press processing conditions (for example) but which at the same time would otherwise have a negative impact on concrete or process characteristics such as green strength or stacking ability.

Further exemplary embodiments can thus include additional admixture components such as the following. For example, a water-insoluble surfactant, such as a low to medium molecular weight block copolymer having blocks of ethylene oxide ("EO") groups and blocks of propylene oxide ("PO") groups, can be included where preferably the number of PO groups exceeds the number of EO groups by a factor of 2 to 10. Such a water-insoluble surfactant may require a small amount of another surfactant in order to solubilize it. This may be included to improve pressing time, but if used by itself (without colloidal silica and alkanolamine(s)) would otherwise very likely decrease green strength.

As another example of an additional admixture component enabled by the colloidal silica/alkanolamine combination is a surfactant which reduces surface tension to an extremely low level. A fluorinated surfactant could be used for this purpose.

As a further example of an additional admixture component enabled by the colloidal silica/alkanolamine combination is a flocculant such as a high molecular weight polyethylene oxide. This component would enable excess water to be extracted from the pressed concrete more quickly, thus expediting the molding and de-molding phases.

Further exemplary additional components could include set accelerators such as calcium nitrite, calcium nitrate, a thiocyanate, diethylene glycol, or mixtures of the foregoing for use at low to ambient temperatures and/or with the use of supplemental cementitious materials.

Further exemplary additional components could include hydration controlling agents such as sugars, hydroxylated organic acid salts, phosphates and phosphonates, or mixtures of the foregoing for use at ambient to elevated temperatures and/or with the use of very reactive cementitious materials.

Still further exemplary additional components can include a biocide or anti-microbial agents. An example of a biocide used in paver units is available from Dow Chemical under the brand name DOWICIL™ 150.

Hence, further exemplary processes and admixture compositions of the invention can further include at least one component, in addition to the colloidal silica and aforementioned alkanolamines, comprising a rheology modifying agent (e.g., polycarboxylate type, biopolymer polysaccharide), a surfactant (e.g., water insoluble surfactant, a surface active agent having low surface tension), a flocculent, set accelerating agent, hydration control agent, defoamer, biocide, or mixtures thereof. These components can be used in amounts according to the desires or design objectives of the user.

In preferred embodiments of the invention, the concrete mix that is poured into the molds will be essentially devoid (e.g., 0.00-0.04 percent by weight of cementitious binder) of certain admixtures which could increase pressing time or undermine or destroy green strength and vertical stackability of the concrete units. Thus, preferred concrete mixes have 0.00-0.01 percent by wt of cementitious binder of a polycarboxylate comb polymer type superplasticizer.

FIG. 1 illustrates the method as summarized in the Summary of the Invention, and reflects the various embodiments described in detail herein. As shown in "STEP 1" of FIG. 1, a concrete slab (flag), curb (kerb) stone, paver, block, or other building unit is made by pouring concrete 16 containing admixtures in accordance with the present invention into a mold 10 and against the various surfaces of the mold, including the bottom surface 12, which, in typical wet press operations, is a bottom press 12. In STEP 2, a top press 14 and the bottom press 12 squeeze (or compress) the concrete slab (or kerbstone or other shape) being formed in the mold 16, employing hydraulic pressure of 400 to 3000 pounds per square inch, to consolidate the mixture into a shape having at least two edges defining therebetween a width dimension and at least two edges defining therebetween a thickness dimension, wherein the width dimension (which would be the vertical standing height when the flag unit 16 is stood on its edge) is at least five times greater than the thickness dimension (between the major opposing faces of the flag unit 16); and excess water is removed and/or drained from the concrete 16 in the mold. (Not shown are (i) fabrics or filters sometimes used on the opposed faces of the concrete slab 16 or (ii) drainage or vacuum devices for removal of the excess water expelled from the concrete 16). In STEP 3, the top press 14 is removed, and the bottom press 12 pushes upward to remove the concrete slab 16 (while in the green state) from the mold. In STEP 4, the removed concrete slab or kerbstone 16 is placed on a side edge, spaced apart from adjacent slabs 16, in a "vertical stack" arrangement on a pallet 20, conveyor belt, or other surface upon which it can be allowed to cure.

In further exemplary processes and concrete compositions and units of the present invention, as mentioned in the Summary of the Invention, it is preferred that the standing green state concrete units removed from the wet press molds have a deflection of less than $\frac{1}{100}^{th}$ from vertical (after elapse of 6 hours, at 10-65 degrees Celsius, between 40-100% humidity). More preferably, the deflection (or "non-eccentricity" is less than $\frac{1}{300}^{th}$; and more preferably, the deflection is less than $\frac{1}{600}^{th}$). The numerator (n) and denominator (d) in the deflection or "non-eccentricity" ratio (n/d) refers to standing height (width) of the concrete unit when it is standing on its thickness face; and, thus, a deflection of less than "$\frac{1}{100}$" means that a unit having a standing height (width) of 100 units will not depart from vertical axis by more than $\frac{1}{100}^{th}$ of the standing height (width) of the unit. Accordingly, a deflection or non-eccentricity of less than $\frac{1}{300}^{th}$ means that the unit will not depart from vertical axis by more than $\frac{1}{300}^{th}$ of the standing height (width) of the unit.

Figures 2, 3:
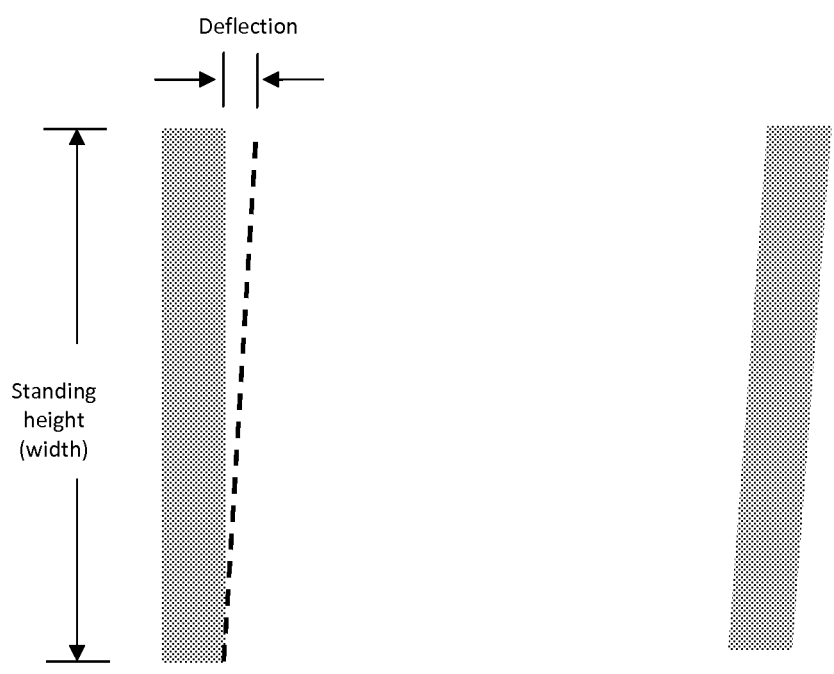
FIG. 2 is a diagram of a concrete slab standing vertically on an edge to demonstrate the concept of "non-eccentricity" which is determined by comparing the deflection to the standing height (or width) of the concrete slab unit.
FIG. 3 is an illustration of a concrete slab demonstrating high eccentricity.

FIG. 2 illustrates the "non-eccentricity ratio" for a given concrete slab that is stood on its side edge, and this ratio is the measurement of deflection (or departure from vertical axis) as divided by the vertically standing height (or width) of the concrete slab or kerbstone 16. FIG. 3 illustrates an "eccentric" standing concrete slab 16 having slanted sides which conform to the deflection (dotted line shown in FIG. 2), and the eccentricity makes the slab profile appear more rhomboid than rectangle.

In further exemplary wet press processes and concrete compositions and units of the present invention as generally illustrated in FIGS. 1 and 2, the present inventors believe that the use of colloidal silica and alkanolamines can allow rounded stone gravel to be employed in the wet press processed concrete slab or kerbstone (or other relatively flat shaped) units 16, while retaining a high degree of non-eccentricity when the resultant concrete slab is stood vertically upon its narrow edge. The term "rounded" generally refers to non-mechanically crushed aggregate which does not have sharp edges due to natural or environmental effects such as sand or stone found in riverbeds, wherein the aggregate has been smoothed to round (generally spherical, ellipsoidal, or other smooth shapes) due to the effects of flowing water and/or wind. Although there might be some decrease in green strength and vertical stack-ability using rounded aggregate when compared to wet press concrete slab units made using manufactured aggregate (mechanically crushed stones or gravel), it is possible to have sufficient green strength and stack-ability using a greater portion of rounded stone gravel and/or natural sand. The ability of the present invention to employ rounded aggregates or a portion of the aggregates using a rounded aggregate can lead to cost reductions, as a greater proportion of local natural aggregate can be used, thus reducing the costs otherwise required for transporting manufactured (crushed) stones or gravel to the wet press manufacturing site.

While the invention is described herein using a limited number of embodiments, these specific embodiments are not intended to limit the scope of the invention as otherwise described and claimed herein. Modification and variations from the described embodiments exist. More specifically, the following examples are given as a specific illustration of embodiments of the claimed invention. It should be understood that the invention is not limited to the specific details set forth in the examples. All parts and percentages in the examples, as well as in the remainder of the specification, are by percentage weight unless otherwise specified.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. For example, whenever a numerical range with a lower limit, RL, and an upper limit RU, is disclosed, any number R falling within the range is specifically disclosed. In particular, the following numbers R within the range are specifically disclosed: $R=RL+k*(RU-RL)$, where k is a variable ranging from 1% to 100% with a 1% increment, e.g., k is 1%, 2%, 3%, 4%, 5% . . . 50%, 51%, 52% . . . 95%, 96%, 97%, 98%, 99%, or 100%. Moreover, any numerical range represented by any two values of R, as calculated above, is also specifically disclosed.

Example 1

Several admixture compositions were formulated and employed in concrete mixes for making wet press concrete slabs in accordance with the present invention.

The concrete slab mix contained crushed fines and sands in the amount of 1240 kg/m³ and having up to 4 mm diameter, along with 310 kg/m³ of cement and fly ash, and further components as described hereinbelow.

The concrete slab mix was further formulated using a colloidal silica product that is commercially available from W. R. Grace & Co.-Conn., Columbia, Md., USA ("GRACE") under the brand name LUDOX®. The formulation (labeled as "EXP 14-1" for identification purposes in the chart provided below) contained 28.5% solids weight of the LUDOX® colloidal silica and 5% solids weight of tetrahydroxyethylethylenediamine ("THEED") (CAS Number 140-07-8, $C_{10}H_{24}N_2O_4$).

Another concrete mix was formulated (labeled as EXP 14-3) using 28.2% solids weight of GRACE LUDOX® colloidal silica and 4% solids weight of triisopropanolamine (CAS Number 67952-34-5, $C_9H_{21}NO_3$).

A further concrete mix was formulated (labeled as EXP 14-2) using 48% solids weight of GRACE LUDOX® colloidal silica and 4% solids weight THEED (CAS Number 140-07-8, $C_{10}H_{24}N_2O_4$).

Yet another concrete mix was formulated (labeled as EXP 14-4) containing 47.6% solids weight of GRACE LUDOX® colloidal silica and 4% solids weight of triisopropanolamine (CAS Number 67952-34-5, $C_9H_{21}NO_3$).

The mix design for the concrete (Mix ID 1) included mechanically crushed aggregates with a maximum size of 14 mm, which are commonly used for wet press process production of slabs (otherwise known as "flags" in the United Kingdom). The flexural strength of the paving flags after 28 days of curing was 6.8 MPa. The paving slabs (flags) had dimensions of 300×300×40 mm³ after the pressing process. The water amounts listed in the table below was the mixing water used to obtain wet concrete having a slump of 160 to 200 mm. About 50% of the water is removed when high pressure (about 1500 psi in the hydraulic press) is applied for approximately 10 to 15 seconds.

In subsequent trials, the coarse aggregates were replaced with a natural rounded gravel 4-10 mm at a 50% level (Mix ID 2-6) and at 100% (Mix ID 7-10). Due to the rounded nature of the gravel the green strength as well as the 28 day flexural strength decreased significantly to 5.8 MPa.

Using the colloidal silica together with strength enhancers (dosage rates in the table below are based on weight percentage of the admixture relative to the cement content) were seen by the present inventors to have a positive effect on the green strength of the flags (the flags could be easily moved and turned on their side for storage while maintaining the exact shape of a prism (stackability)), on the surface finishability and definition and on the 28 day flexural strength. The 28 day flexural strength was increased from 5.8 MPa to 6.5 MPa with the addition of 0.8% EXP 14-4 and 0.6% EXP 14-2.

Results are set forth in Table 1.

TABLE 1

| Mix ID | Crushed aggregates (<15 mm) (kg/m³) | Rounded gravel 4-10 mm (kg/m³) | Water (kg/m³) | Admixture formulated according to Example 1 | Dosage rate (%) | Flexural strength (MPa) | | |
|---|---|---|---|---|---|---|---|---|
| | | | | | | 7 days | 14 days | 28 days |
| 1 | 660 | | 250 | | | 5.3 | 6.5 | 6.8 |
| 2 | 330 | 360 | 270 | | | 5.1 | 6.0 | 5.7 |
| 3 | 330 | 360 | 270 | EXP 14-1 | 0.2 | 5.0 | 5.7 | 5.9 |
| 4 | 330 | 360 | 230 | EXP 14-2 | 0.8 | 5.3 | 5.7 | 6.1 |
| 5 | 330 | 360 | 220 | EXP 14-3 | 0.6 | 5.0 | 6.4 | 6.2 |
| 6 | 330 | 360 | 215 | EXP 14-4 | 0.8 | 5.1 | 4.8 | 6.5 |
| 7 | | 720 | 220 | | | 4.9 | 5.7 | 5.8 |
| 8 | | 720 | 220 | EXP 14-1 | 0.6 | 4.8 | 4.5 | 5.8 |
| 9 | | 720 | 220 | EXP 14-2 | 0.8 | 4.5 | 5.3 | 6.4 |
| 10 | | 720 | 220 | EXP 14-3 | 0.6 | 4.6 | 4.5 | 5.6 |

While the disclosure is described herein using a limited number of embodiments, these specific embodiments are not intended to limit the scope of the disclosure as otherwise described and claimed herein. Modification and variations from the described embodiments exist. More specifically, the following examples are given as a specific illustration of embodiments of the claimed disclosure. It should be understood that the invention is not limited to the specific details set forth in the examples.

What is claimed is:

1. A process for wet press process manufacturing of cementitious units, comprising:
    introducing, into a concrete mold having a plurality of corners to define transverse edges of a molded unit, a concrete mixture comprising (a) a hydratable cement binder, (b) aggregates comprising sand, crushed gravel, or mixture thereof, and (c) water in an amount sufficient (i) to hydrate the cement binder and (ii) to enable the mixture to flow into corners within the mold;
    wet-pressing the concrete mixture within the mold, using hydraulic pressure of 400 to 3000 pounds per square inch, to consolidate the mixture into a shape having at least two edges defining therebetween a width dimension and at least two edges defining therebetween a thickness dimension, wherein the width dimension is at least five times greater than the thickness dimension, and removing excess water from the concrete mixture while in the mold;
    removing the wet-pressed concrete from the mold while in a green state;
    standing the wet-pressed, green state concrete unit, upon removal from the mold, onto the at least two edges which define the thickness dimension of the concrete unit; and
    repeating the foregoing steps such that at least three standing wet-pressed, green state concrete units removed from molds are standing, during a curing period, adjacent to each other at a distance apart which is less than their individual width dimension;
    wherein the concrete mixture introduced into and removed from the mold further comprises: (a) colloidal silica having silica particles with an average particle size of 1 nm (nanometer) to 100 nm (nanometer), the colloidal silica comprising a monosperse or multisperse suspension of silica particles having generally spherical shapes and having specific surface area (SSA) of 10-1500 square meters per gram ($m^2/g$ $SiO_2$); (b) at least one alkanolamine; and (c) optionally, a rheology modifying agent; wherein the colloidal silica and at least one alkanolamine are effective to increase green strength of the wet-pressed, green state concrete units as well as flexural strength of the demolded concrete units.

2. The process of claim 1 wherein the at least one alkanolamine is selected from tetrahydroxyethylethylenediamine, triisopropanolamine, methyldiethanolamine, or mixture thereof.

3. The process of claim 2 wherein the at least one alkanolamine of component (b) further comprises triethanolamine.

4. The process of claim 2 wherein the at least one alkanolamine of component (b) comprises triisopropanolamine and triethanolamine.

5. The process of claim 2 wherein at least one alkanolamine of component (b) comprises tetrahydroxyethylethylenediamine and triethanolamine.

6. The process of claim 1 wherein the colloidal silica has SSA of 100-500 square meters per gram ($m^2/g$ $SiO_2$).

7. The process of claim 1 further comprising a rheology modifying agent selected from the group consisting of a polycarboxylate type rheology modifying agent; and a biopolymer polysaccharide selected from diutan gum, welan gum, xanthan gum, or a mixture thereof.

8. The process of claim 1 wherein the rheology modifying agent is a polycarboxylate type.

9. The process of claim 1 wherein the concrete mixture introduced into the mold further comprises a rheology modifying agent, a surfactant, a flocculent, a set accelerating agent, a hydration control agent, a defoamer, a biocide, or a mixture thereof.

10. The process of claim 1 wherein the aggregate contains rounded particles.

11. The process of claim 1 wherein the standing green state concrete units removed from molds have a deflection of less than $1/100^{th}$ from vertical (after elapse of 6 hours, at 10-65 degrees Celsius, between 40-100% humidity).

12. The process of claim 1 wherein the standing green state concrete units removed from molds have a deflection of less than $1/300^{th}$ from vertical (after elapse of 6 hours, at 10-65 degrees Celsius, between 40-100% humidity).

13. The process of claim 1 wherein the amount of colloidal silica and alkanolamines are 0.03-1.0% actives and 0.0025-0.1% actives, respectively, based on weight of cement.

* * * * *